US010017259B2

(12) United States Patent
Bouillon et al.

(10) Patent No.: US 10,017,259 B2
(45) Date of Patent: Jul. 10, 2018

(54) DE-ICING SPLITTER FOR AN AXIAL TURBINE ENGINE COMPRESSOR

(71) Applicant: Safran Aero Boosters SA, Herstal (BE)

(72) Inventors: David Bouillon, Woluwe-Saint-Lambert (BE); Clément Collin, Grivegnee (BE); Guillaume Terlinden, Scharbeek (BE)

(73) Assignee: Safran Aero Boosters SA, Herstal (BE)

( * ) Notice: Subject to any disclaimer, the term of this patent is extended or adjusted under 35 U.S.C. 154(b) by 0 days.

(21) Appl. No.: 15/233,340

(22) Filed: Aug. 10, 2016

(65) Prior Publication Data

US 2017/0043877 A1 Feb. 16, 2017

(30) Foreign Application Priority Data

Aug. 13, 2015 (BE) .................................. 2015/5508

(51) Int. Cl.
| | |
|---|---|
| *F01D 25/02* | (2006.01) |
| *F02C 7/047* | (2006.01) |
| *B64D 15/04* | (2006.01) |
| *B64D 33/02* | (2006.01) |

(52) U.S. Cl.
CPC ............ *B64D 15/04* (2013.01); *B64D 33/02* (2013.01); *F01D 25/02* (2013.01); *F02C 7/047* (2013.01); *B64D 2033/0233* (2013.01); *F05D 2220/323* (2013.01); *Y02T 50/671* (2013.01)

(58) Field of Classification Search
CPC .............. F01D 25/02; F05D 2260/201; F05B 2260/201; F02C 7/047; F02C 6/08; F02C 9/18; B64D 15/02; B64D 15/04; B64D 2033/0233

USPC ................................ 415/144, 145, 176–178
See application file for complete search history.

(56) References Cited

U.S. PATENT DOCUMENTS

| 6,561,760 B2 | 5/2003 | Wadia et al. | |
|---|---|---|---|
| 2003/0035719 A1 | 2/2003 | Wadia et al. | |
| 2009/0155046 A1* | 6/2009 | Haas ..................... | B64D 33/02 415/58.4 |
| 2012/0192544 A1* | 8/2012 | Roby ..................... | F01D 25/02 60/226.1 |
| 2014/0205427 A1* | 7/2014 | Mazet ..................... | F01D 25/02 415/1 |

(Continued)

FOREIGN PATENT DOCUMENTS

| EP | 2821597 A1 | 1/2015 |
|---|---|---|
| FR | 2999235 A1 | 6/2014 |
| WO | 2014182289 A1 | 11/2014 |

OTHER PUBLICATIONS

Search Report dated Mar. 31, 2016 for BE 201505508.

*Primary Examiner* — Christopher Verdier
(74) *Attorney, Agent, or Firm* — James E. Walton

(57) ABSTRACT

A de-icing and anti-icing splitter for an axial turbine engine low-pressure compressor has an external annular wall delimiting the secondary or bypass flow, and an internal annular wall; notably an external stator shroud; delimiting the primary or main stream. The upstream edge of the internal wall is fixed to the upstream annular hook of the external wall. The splitter has a series of notches which pass radially through the internal wall to allow de-icing fluid to circulate through the hook. The notches may form crescents. The splitter becomes simpler while at the same time maintaining optimal efficiency.

15 Claims, 3 Drawing Sheets

(56) References Cited

U.S. PATENT DOCUMENTS

2016/0097323 A1\* 4/2016 Prather .................. F01D 25/02
                                                         415/178

\* cited by examiner

DE-ICING SPLITTER FOR AN AXIAL TURBINE ENGINE COMPRESSOR This application claims priority under 35 U.S.C. § 119 to Belgium Patent Application No. 2015/5508, filed 13 Aug. 2015, "De-Icing Splitter for an Axial Turbine Engine Compressor," which is incorporated herein by reference for all purposes.

BACKGROUND

1. Field of the Application

The present application relates to a de-icing splitter for an axial turbine engine. More specifically, the present application relates to the de-icing of a splitter by reinjecting a hot gas into the splitter. The present application also relates to an axial turbine engine, notably to an aeroplane turbojet or to an aircraft turboprop engine.

2. Description of Related Art

An aeroplane multi-stream turboprop engine is designed to be environmentally friendly. With a view to optimizing thrust and efficiency, while at the same time reducing noise nuisance, a turboprop engine operates using several annular streams of air. To do that, the turboprop engine splits an incoming stream into a primary or main stream and a secondary or bypass stream. The streams are separated by a circular splitter positioned upstream of the compressor. At this point, it forms the air inlet for the compressor.

The air entering the turbine engine remains at atmospheric temperature at the splitter. Because these temperatures may drop as low as −50° C. at altitude, ice may form on the splitter with moisture. During flight, this ice may spread and accumulate until it forms blocks at the tips of the compressor stator vanes. These blocks may also alter the geometry of the splitter and influence the stream of air entering the compressor, and this may impair the efficiency thereof.

As they develop, the blocks may become heavy and then break off as a result of turbine engine vibrations. Carried along in the incoming stream, these blocks may be ingested by the compressor, with the risk of damaging the rotor blades on their way through. This ingestion is particularly penalising when it does not pass through the fan beforehand. In order to limit this formation of ice, splitters are provided with de-icing devices.

Document U.S. Pat. No. 6,561,760 B2 divulges an axial turbine engine compressor provided with a de-icing splitter. The latter is heated by a circulation of hot air bled from a compressor of the turbine engine. The hot air is injected into the splitter then escapes, infiltrating the upstream hook between the external wall of the splitter and the external shroud. Axial grooves are formed in the external shroud to form a passage through the hook, which means that the de-icing flow is optimised. However, such a splitter remains expensive because of the way in which the interfaces are arranged. The geometry of the passages is complex, and this detracts from operation since the manufacturing tolerances impair the actual operating conditions.

Although great strides have been made in the area of de-icing splitters for axial turbine engine compressors, many shortcomings remain.

DETAILED DESCRIPTION OF THE PREFERRED EMBODIMENT

Figure 1:
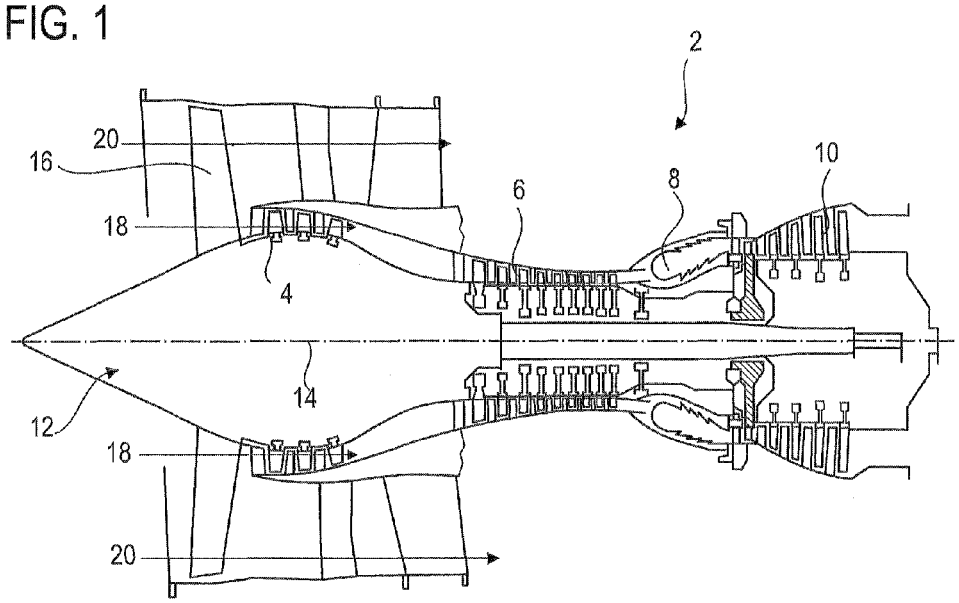
FIG. 1 shows an axial turbine engine according to the present application.

The present application aims to solve at least one of the problems presented by the prior art. More specifically, it is an objective of the present application to simplify a de-icing splitter. The present application also aims is to make a splitter more lightweight.

One subject of the present application is a splitter for an axial turbine engine, notably for a compressor of an axial turbine engine, the splitter comprising: an external annular wall; an internal annular wall with a circular upstream edge connected to the external wall, the internal wall being configured to delimit an internal annular stream separated by the splitter, notably a primary or main stream; notable in that the upstream edge of the internal wall comprises at least one notch which passes radially through the internal wall so as to allow de-icing fluid to circulate through the internal wall.

According to an advantageous embodiment of the present application, the internal wall comprises at least one slot formed in its thickness and which extends the or each notch axially.

According to an advantageous embodiment of the present application, the or each notch is crescent-shaped, possibly having a crescent-shaped profile.

According to one advantageous embodiment of the present application, the internal wall comprises a smooth external annular surface which axially delimits the or each notch, the external wall potentially diverging progressively radially towards the outside of the said external surface in the downstream direction.

According to one advantageous embodiment of the present application, the internal wall comprises an upstream bearing surface on which its upstream edge is formed, and which forms an increase in diameter, the upstream bearing surface preferably forming an annular step.

According to one advantageous embodiment of the present application, the internal wall comprises an internal annular surface and an internal annular channel formed on the said internal surface, the said annular channel axially delimiting the or each notch and/or being in communication with the or each notch.

According to one advantageous embodiment of the present application, the internal wall is an external shroud and/or supports an annular row of vanes extending radially towards the inside from the said internal wall, and/or supports an internal annular seal, notably an annular layer of abradable material.

According to one advantageous embodiment of the present application, the external wall comprises at least one passage in communication with the notch, and preferably several passages each in communication with one of the notches.

According to one advantageous embodiment of the present application, the or each passage is an axial groove, possibly inclined with respect to the central axis of the splitter.

According to one advantageous embodiment of the present application, the or each passage is axially distant from the or each notch of the internal wall.

According to one advantageous embodiment of the present application, the external wall comprises an annular hook, the upstream edge of the internal wall being fixed to the said annular hook, the annular hook preferably having an annular recess facing in the downstream direction and in which the upstream edge of the internal wall is mounted.

According to one advantageous embodiment of the present application, the annular hook forms the upstream end of the external wall, the splitter preferably comprising a circular leading edge formed on the annular hook.

According to one advantageous embodiment of the present application, the upstream edge lies axially flush with the external wall, the splitter preferably comprising an annular mechanical clearance between the upstream edge and the external wall which is less than the depth of the or each notch, and/or less than or equal to 5.00 mm, more preferably less than or equal to 2.00 mm, and possibly less than or equal to 0.50 mm.

According to one advantageous embodiment of the present application, the external wall comprises an internal annular portion and an external annular portion between which the upstream edge of the internal wall is interposed, the internal portion being radially thicker than the external portion.

According to one advantageous embodiment of the present application, the internal annular portion and the external annular portion axially overlap, the external portion generally preferably being of constant thickness and/or the external annular portion being the main portion of the external wall.

According to one advantageous embodiment of the present application, the splitter comprises an annular space in communication with the or each notch, the said space being delimited by the internal wall and the external wall.

According to one advantageous embodiment of the present application, the internal wall and the external wall comprise annular fixing flanges fixed to one another and which are positioned downstream of the or each notch, the said flanges potentially delimiting the annular space.

According to one advantageous embodiment of the present application, the splitter is a de-icing and/or anti-icing splitter notably configured to allow a circulation of hot air and/or to reinject the de-icing air into the internal stream.

According to one advantageous embodiment of the present application, the external annular wall is intended to guide an external annular stream inside the turbine engine, notably a secondary or bypass stream.

According to one advantageous embodiment of the present application, the internal annular wall is on the inside of the external wall, the said walls being coaxial.

According to one advantageous embodiment of the present application, the or each passage is in communication with the annular channel, and/or the annular channel is interposed axially and/or radially between the passages and the notches.

According to one advantageous embodiment of the present application, the leading edge splits an upstream stream into an external stream and into the internal stream which flow axially.

According to one advantageous embodiment of the present application, the external wall has a variable thickness and possibly a maximum thickness upstream.

According to one advantageous embodiment of the present application, the internal wall and/or the external wall are each one-piece elements preferably formed as an integral part, and/or may be made of metal and the passages may be machined therein.

Another subject of the present application is an external shroud of a turbine engine, notably of an axial turbine engine compressor, the shroud comprising an annular row of vanes, or an annular zone for accepting vanes possibly formed by an annular row of openings to accept vane platforms and a circular upstream edge, notable in that the upstream edge of the external shroud comprises at least one notch which passes radially through it so as to allow de-icing fluid to circulate through the said edge.

Another subject of the present application is a splitter with an external shroud able to accept an annular row of stator vanes, the external shroud having a circular upstream edge fixed to the said splitter, notable in that the upstream edge comprises at least one notch which passes radially through the external shroud so as to allow de-icing fluid to circulate through the external shroud. With this approach, the splitter here is likened to the external wall set out hereinabove.

Another subject of the present application is a turbine engine compressor comprising a splitter and notable in that the splitter is a splitter according to the present application.

Another subject of the present application is a turbine engine comprising a splitter notable in that the splitter is a splitter according to the present application.

According to one advantageous embodiment of the present application, the turbine engine comprises a compressor, notably a high-pressure compressor, and an air bleed pipe in communication with the said compressor and the or each notch so as to supply the splitter with de-icing air.

According to one advantageous embodiment of the present application, the turbine engine comprises a compressor, notably a low-pressure compressor, the splitter forming the inlet of the said compressor.

In general, the advantageous embodiments of each subject matter of the present application also apply to the other subject matter of the present application. Wherever possible, each subject matter of the present application can be combined with the other subject matter.

The present application simplifies the splitter while at the same time forming an antichamber for the hot gas. The number of components is reduced, and the shape of the shroud allows control over the flow thanks to the sizing of the notches. What happens is that their passage cross section limits the amount of flow passing through them. Moreover, this solution makes it possible to reduce mass because the exterior wall can remain of constant thickness above the upstream edge of the internal wall.

The arrangement makes the splitter economical. Specifically, the notches are shapes that are simple to achieve; over reduced lengths. When they are machined, the amount of material to be removed is limited. The zone in which they are cut is readily accessible and is of a stiffness suited to the cutting loadings involved. The effect of expansion on the bore section of the notches is lower. The arrangement makes it possible to maintain de-icing effectiveness that is independent of temperature, something that is of particular importance in the case of walls liable to frost.

The present architecture optimises operation because heating up can be achieved uniformly at all points. The thickness inside the external wall is compensated for by the grooves formed therein. Thus, the temperature of the supplied air can be reduced while at the same time maintaining safety.

In the description which will follow, the terms interior or internal and exterior or external refer to positioning with respect to the axis of rotation of an axial turbine engine. The axial direction corresponds to the direction along the axis of rotation of the turbine engine. The radial direction is perpendicular to the axis of rotation. Upstream and downstream are with reference to the direction in which the stream primarily flows through the turbine engine.

FIG. 1 is a simplified depiction of an axial turbine engine. In this particular instance it is a bypass turbojet engine. The turbojet engine 2 comprises a first compression level, referred to as the low-pressure compressor 4, a second compression level, referred to as the high-pressure compressor 6, a combustion chamber 8 and one or more levels of turbines 10. In operation, the mechanical power from the turbine 10, transmitted via the central shaft to the rotor 12, turns the two compressors 4 and 6. The latter comprise several rows of rotor blades associated with rows of stator vanes. Rotation of the rotor about its axis of rotation 14 thus makes it possible to generate an air flow and to compress this gradually as far as the inlet to the combustion chamber 8. Step-down gearing means allow the rotational speed transmitted to the compressors to be increased.

An inlet blower commonly referred to as the fan 16 is coupled to the rotor 12 and generates a stream of air which is split into a primary or main flow 18 that passes through the various aforementioned levels of the turbine engine, and a secondary or bypass stream 20 which passes along an annular duct (depicted in part) along the machine and then meet up with the primary or main flow at the outlet from the turbine. The secondary or bypass stream may be accelerated in order to generate a thrust reaction. The main 18 and bypass 20 streams are annular streams and are ducted by the casing of the turbine engine. Each flows axially. For that, the casing has cylindrical walls or shrouds which may be internal and external.

Figure 2:
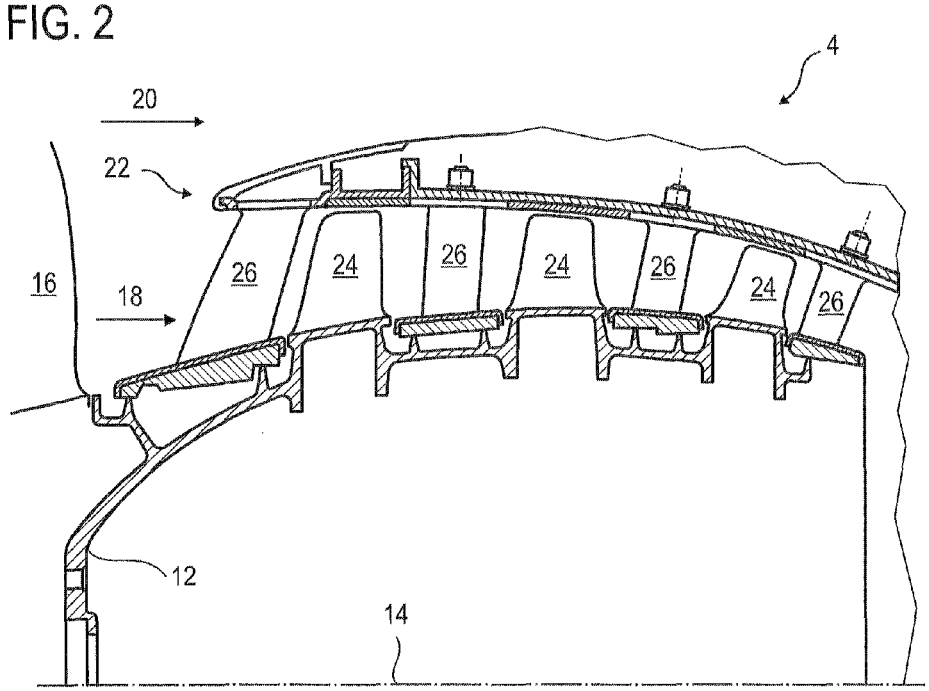
FIG. 2 is a diagram of a compressor of a turbine engine according to the present application.

FIG. 2 is a view in section of a compressor of an axial turbine engine like that of FIG. 1. The compressor may be a low-pressure compressor 4. Here may be seen part of the fan 16 and the splitter 22 that separates the main stream 18 from the bypass stream 20. The rotor 12 comprises several rows of rotor blades 24, in this instance three.

The low-pressure compressor 4 comprises several stators, in this instance 4, each containing one row of stator vanes 26. The stators are associated with the fan 16 or with a row of rotor blades in order to straighten the stream of air so as to convert the speed of the stream into static pressure. The stator vanes 26 extend essentially radially from an exterior casing or exterior shroud and may be fixed and immobilised there using pins. Alternatively, they may be welded using laser welding techniques. Certain vanes may differ from the rest of the vanes in their row.

Figure 3:
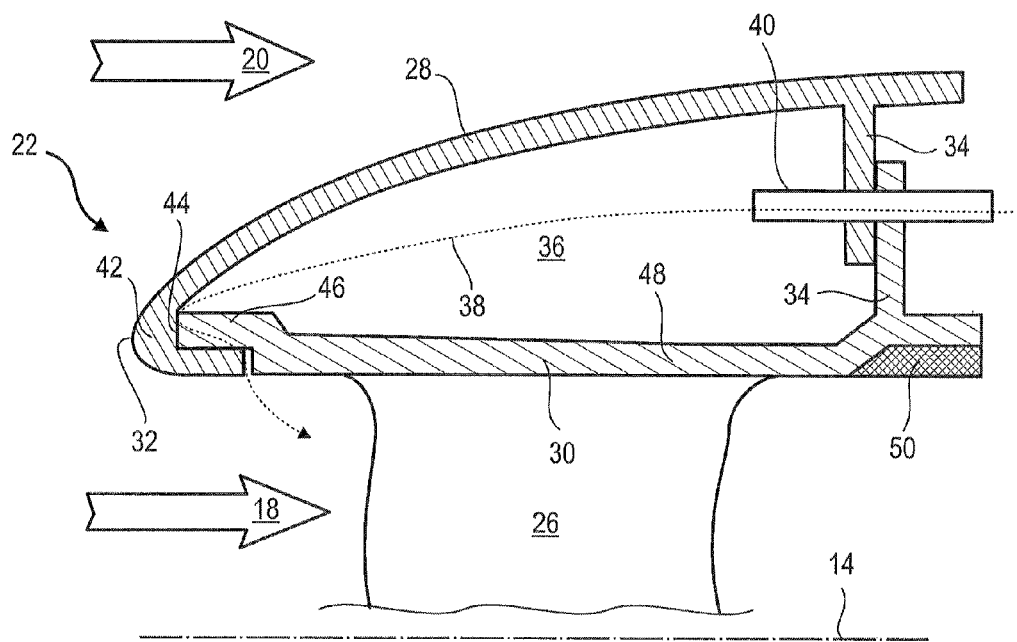
FIG. 3 illustrates a splitter according to the present application.

FIG. 3 depicts the splitter 22 that splits a stream entering the turbine engine. The splitter 22 may correspond to the one at the inlet to the low-pressure compressor illustrated in FIG. 2.

The splitter 22 comprises an external annular wall 28 and an internal annular wall 30. These walls (28; 30) are concentric; they guide and delimit the secondary or bypass stream 20 and the primary or main stream 18 respectively. More precisely, these streams (18; 20) are separated by the circular leading edge 32, or splitting edge, which forms the upstream end of the said splitter 22. It is the first to receive the ingestions.

The walls (28; 30) may comprise annular fixing flanges 34, possibly fixed together using fixing pins (not depicted) distributed angularly. They may form a fluid-tight partition between the walls (28; 30). In combination, the walls (28; 30) delimit an annular space 36 which is closed at the downstream end by the fixing flanges 34. This annular space 36 is supplied with de-icing fluid, in this instance hot gas. The flow 38 or the presence of hot gas makes it possible to de-ice and/or prevent the build up of ice on the splitter 22, whether this be in contact with the primary or main stream 18 or with the secondary or bypass stream 20.

The splitter 22 may comprise a hot air supply duct 40. This may be a duct 40 for bleeding air from a compressor of the turbine engine, for example the high-pressure compressor. The bleed is advantageously downstream of said compressor, optionally at the last compression stage thereof. The duct 40 is in communication with the internal annular space 36 of the splitter, and therefore with the passage for the reinjection of de-icing fluid into the compressor. The passage may form an exhaust.

The external wall 28 may be one-piece. It may comprise an annular hook 42 forming its upstream end and notably the leading edge 32 thereof. The upstream edge 44 of the internal wall 30 is fixed to the said annular hook 42 making it possible to hold the upstream end of the internal wall 30 which cantilevers. A centring and marrying of the surfaces delimiting the primary or main stream 18 are also assured. The annular hook 42 may have an annular recess open in the downstream direction. The recess accepts the upstream edge 44 of the internal wall 30 and attaches it there.

The internal wall 30 generally has a multi-section configuration, with the sections notably having different diameters. It comprises an upstream bearing surface 46 for mounting with the upstream edge and is in contact with the external wall 28. The upstream bearing surface 46 forms an increase in diameter and exhibits two annular steps, an internal one and an external one. A main section 48, or central section, may support an annular row of stator vanes 26. A downstream section may accommodate an internal annular seal 50, notably an annular layer of abradable material 50. Such a layer 50 forms a seal able to crumble away if it comes into contact with a rotor blade when the turbine engine is running.

Figure 4:
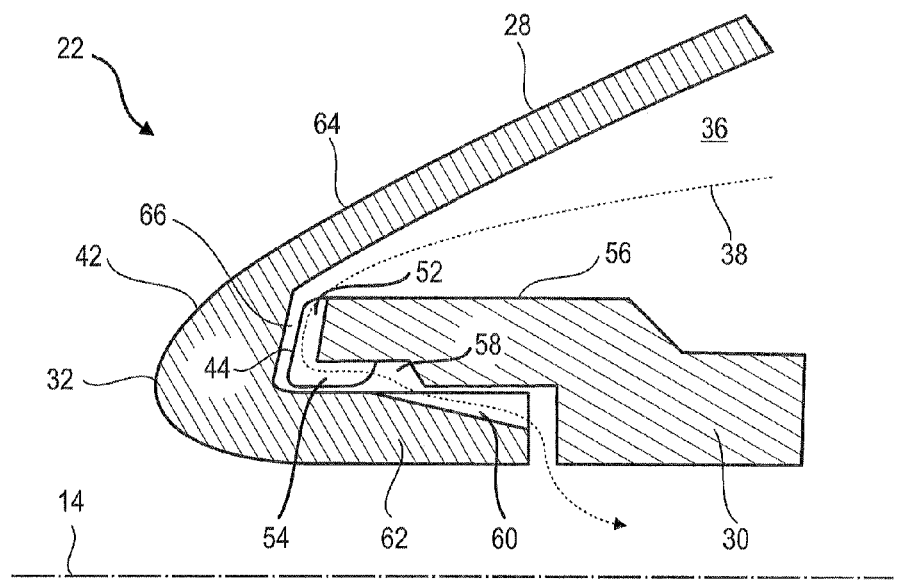
FIG. 4 is an enlargement of the upstream tip of the splitter according to the present application.

FIG. 4 is an enlargement of the splitter 22 at the leading edge 32. Here are depicted the internal wall 30 and the external wall 28 and, in particular, their interface contrived to allow the flow of de-icer 38.

The passage that allows the flow of the de-icing fluid 38 has at least one notch 52 formed in the upstream edge 44 of the internal wall 30. For preference, the upstream edge 44 has a plurality of notches 52 distributed around its perimeter and in communication with the annular space 36 that accepts the de-icing fluid. Each notch 52 forms an indentation in the edge 44, a gap penetrating axially into the internal wall 30. Each notch 52 passes radially through the upstream edge 44 and facilitates the passage from the outside towards the inside of the internal wall 30. In this particular instance, the notches 52 allow the de-icing fluid 38 to flow towards the inside of the splitter 22, towards the inside of the internal surface of the internal wall 30, and this optimises the de-icing. The notches 52 may each have a curved shape, such as that of a crescent. What is meant by a crescent is the internal surface of a first disc from which the surface of another disc that intersects the first disc at two points is subtracted.

Each notch 52 is extended by a slot 54 cut into the radial thickness of the internal wall 30. This extends a notch 52 axially and follows the external surface of the external wall 28 which faces it. The meeting of the walls forms ducts of generally closed profile to channel and control the flow of de-icer 38.

The internal wall 30 comprises a smooth external annular surface 56 which axially delimits the notches 52 and which is extended upstream between the notches 52. The external wall 28 diverges progressively towards the outside radially from the said external surface 56 in the downstream direction. Thus, the annular space 36 extends as far as the upstream edge 44 of the internal wall 30, encouraging the application of heat energy as far as the leading edge 32.

The internal wall 32 potentially comprises an internal surface with an internal annular channel 58 cutting radially outwards into the thickness of the internal wall 30. This annular channel 58 communicates with each notch 52, delimiting same. More specifically, each axial slot 54 opens onto the annular channel 58 that allows them to be connected.

The external wall 28 comprises at least one passage 60 in communication with a notch 52. For preference it comprises several passages 60 each of which is placed in alignment with at least one notch 52 so as to allow a passage from the one to the other. For example, a passage 60 may be placed facing at least three notches 52 and may communicate with them. The or each passage 60 is an axial groove the bottom of which is potentially inclined with respect to the axis of rotation of the turbine engine 14, this axis potentially coinciding with the central axis 14 of the splitter 2. The inclined passages 60 allow better reinjection of the flow 38 into the primary or main stream. The formation of vortices is reduced and the efficiency of the turbine engine is maintained. Alternatively, one or more passages are orifices passing through the external wall.

The passages 60 and the notches 52 may communicate via the annular channel 58, thus allowing positional deviations. The passages 60 and the notches 52 may thus be axially and angularly distant from one another since the channel is interposed at the interface between them. However, the presence of the channel is optional because the passages and the notches may communicate directly.

The annular hook 42 of the external wall 28 comprises an internal annular portion 62 and an external annular portion 64 which occupy one and the same axial section. The upstream edge 44 of the internal wall 30 is slipped between them. The internal portion 62 is radially thicker than the external portion 64 in order to offer greater strength because this is the one that supports the internal wall 30. The external portion 64 is generally of constant thickness and forms the main portion of the external wall 28 because of its axial length. The upstream edge 44 of the internal wall 30 axially hugs the annular hook 42. This edge 44 lies flush with the bottom thereof. However, an annular mechanical clearance 66 separates them. This clearance 66 is less than the axial depth of the notches 52. It may be less than or equal to 0.05 mm.

Figure 5:
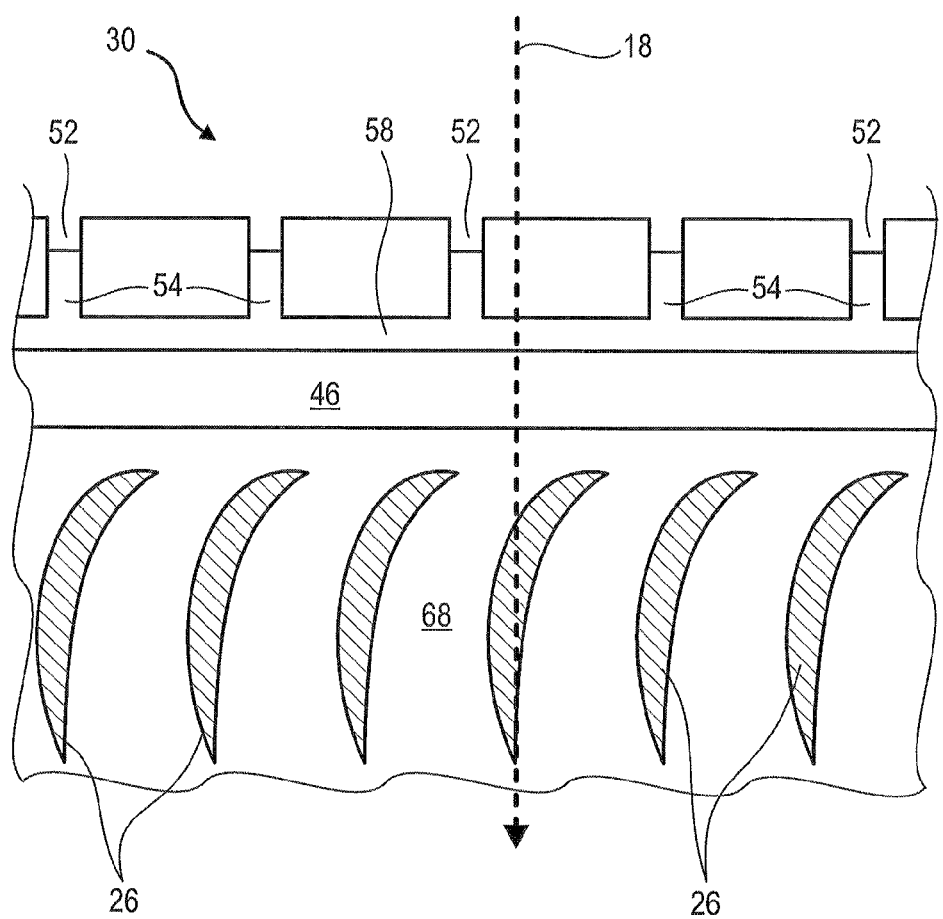
FIG. 5 shows an internal wall of the present application seen from the inside.

FIG. 5 shows an internal view of a portion of the internal wall 30. Depicted there is a series of stator vanes 26, and the primary or main stream 18. For the sake of clarity, the external wall has not been depicted.

The internal wall supports several stator vanes 26 of an annular row. The upstream edge 44 forms crenellations between the notches 52. These cut into the upstream edge 44 towards the vanes 26, then extend in this same direction by virtue of their slots 54. The latter meet in the annular channel 58 which is generally formed in a central position of the upstream bearing surface 46, and/or on the internal step of the internal wall 30.

The aerofoils of the vanes 26 may be fixed directly to the internal surface 68 of the shroud. Alternatively, they may have platforms or root bulbs welded into openings formed in the shroud. The internal wall 30 may be an external shroud at a compressor inlet.

We claim:

1. An axial turbine engine splitter, comprising:
an external annular wall;
an internal annular wall being configured in order to delimit an internal annular stream separated by the splitter, the internal wall including a circular upstream edge which is connected to the external wall; and
at least one notch which passes radially through the internal wall so as to allow de-icing fluid to circulate radially through the internal wall,
wherein the internal wall comprises at least one slot formed in the thickness thereof and which extends axially the notch.

2. The axial turbine engine splitter of claim 1, wherein the internal wall comprises:
a smooth external annular surface which axially delimits the notch, the external wall diverging progressively radially towards the outside of the external surface in the downstream direction.

3. The axial turbine engine splitter of claim 1, wherein the internal wall comprises:
an upstream bearing surface on which an upstream edge is formed, and which forms a portion of increased diameter, the upstream bearing surface forming an annular step.

4. The axial turbine engine splitter of claim 1, wherein the internal wall comprises:
an internal annular surface and an internal annular channel formed on the internal annular surface, the annular channel axially delimiting each notch and being in communication with each notch.

5. The axial turbine engine splitter of claim 1, wherein the internal wall is an external shroud which supports an annular row of stator vanes projecting radially inwards.

6. The axial turbine engine splitter of claim 1, wherein the internal wall supports an inner annular seal.

7. The axial turbine engine splitter of claim 1, wherein the external wall comprises:
at least one passage in communication with the notch.

8. The axial turbine engine splitter of claim 1, wherein the external wall comprises:
an annular hook, the upstream edge of the internal wall being fixed to the annular hook, the annular hook having an annular recess in which the upstream edge of the internal wall is mounted.

9. The axial turbine engine splitter of claim 1, wherein the external wall comprises:
an internal annular portion and an external annular portion between which the upstream edge of the internal wall is interposed, the internal portion being radially thicker than the external portion.

10. The axial turbine engine splitter of claim 1, further comprising:
an annular space in communication with the notch, the annular space being delimited by the internal wall and the external wall.

11. The axial turbine engine splitter of claim 1, wherein the internal wall and the external wall comprise:
annular fixing flanges fixed to one another and which are positioned downstream of the notch.

12. An axial turbine engine splitter, comprising:
an external annular wall;
an internal annular wall which is intended to delimit an internal annular stream separated by the splitter, the internal annular wall including:
a circular upstream edge which is connected to the external wall, and an internal annular surface and an internal annular channel formed on the internal annular surface,
wherein the upstream edge comprises at least one notch which passes radially through the internal wall so as to allow de-icing fluid to circulate radially through the internal wall, the internal annular channel axially delimiting each notch and being in communication with each notch.

13. The axial turbine engine splitter of claim 12, wherein the external wall comprises:
at least one passage in communication with the notch, the passage comprising an the axial inner bottom which is inclined with respect to the central axis of the splitter.

14. The axial turbine engine splitter of claim 13, wherein the passage is an axial groove.

15. The axial turbine engine splitter of claim 13, wherein the passage is axially remote from the notch of the internal wall.

\* \* \* \* \*